March 24, 1931.  O. A. ROSS  1,797,274
MOTION PICTURE CAMERA
Filed Sept. 19, 1928   2 Sheets-Sheet 1
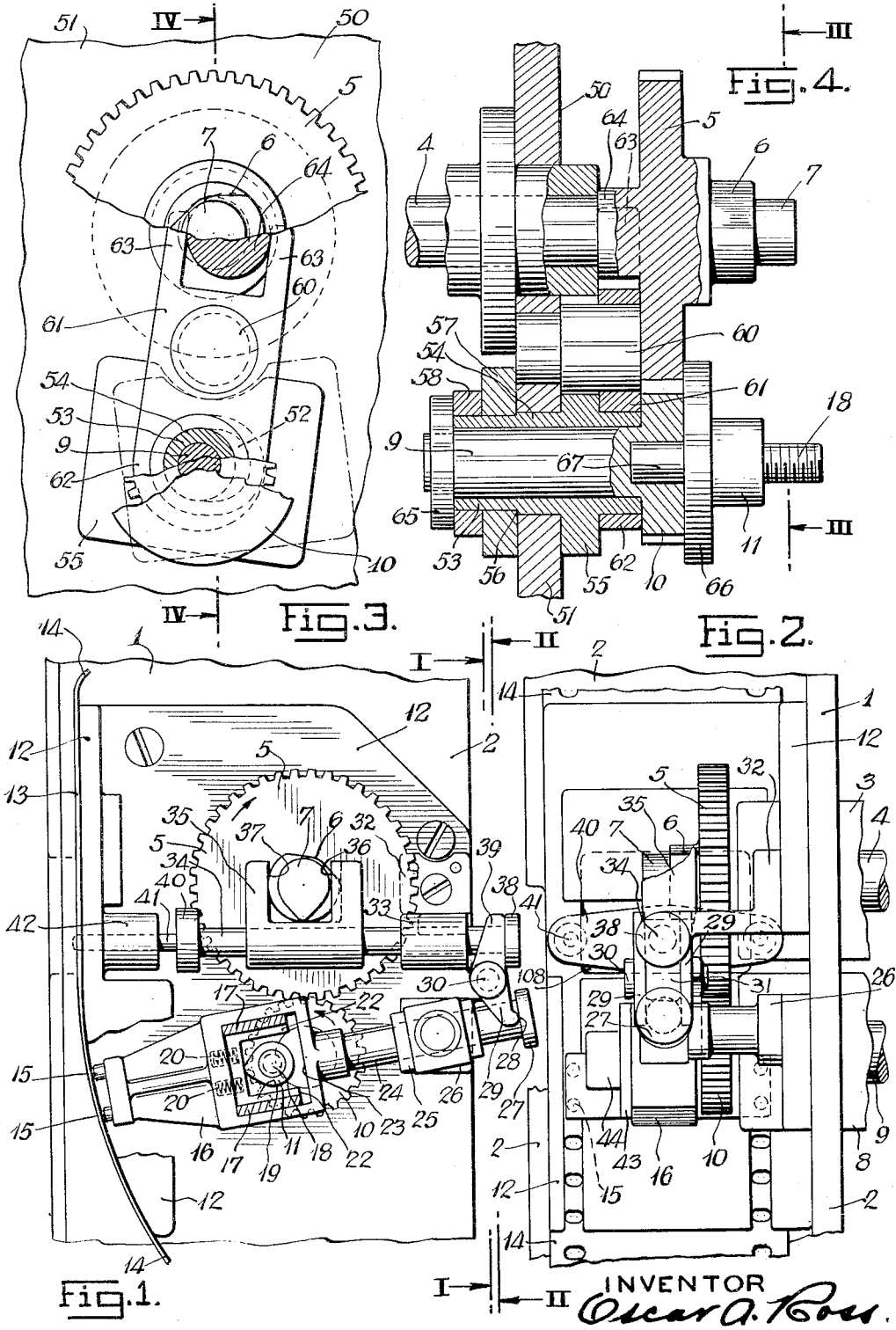
INVENTOR
Oscar A. Ross.

March 24, 1931.  O. A. ROSS  1,797,274
MOTION PICTURE CAMERA
Filed Sept. 19, 1928  2 Sheets-Sheet 2
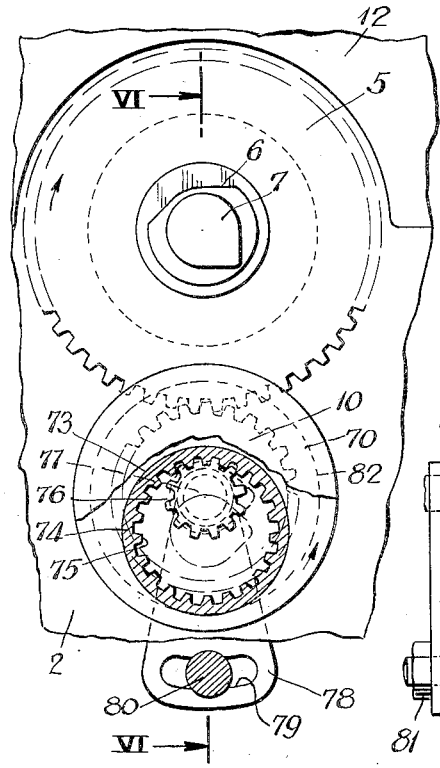
Fig.5.
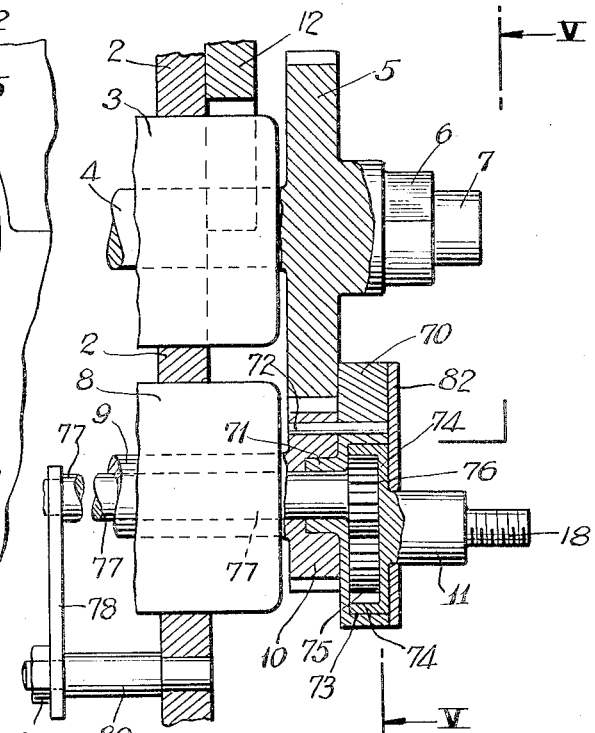
Fig.6.
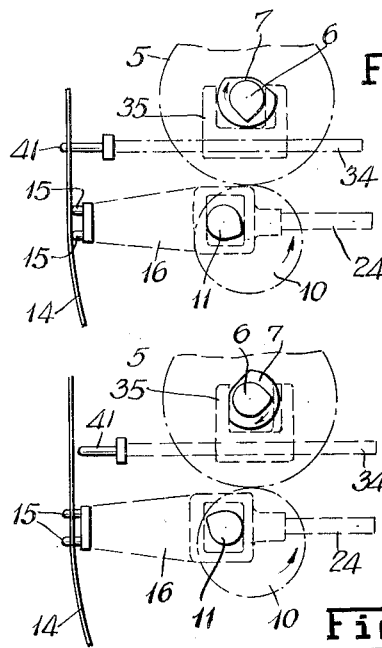
Fig.7.
Fig.8.
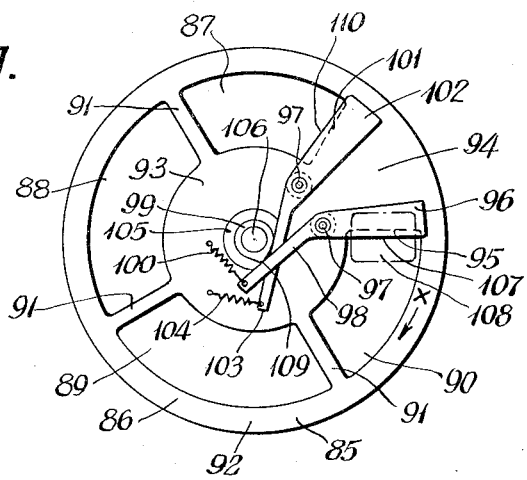
Fig.9.
INVENTOR
Oscar A. Ross Patented Mar. 24, 1931

1,797,274

UNITED STATES PATENT OFFICE

OSCAR A. ROSS, OF NEW YORK, N. Y.

MOTION-PICTURE CAMERA

Application filed September 19, 1928. Serial No. 306,916.

This invention refers to motion picture camera mechanism and more particularly to that class of mechanism more generally known as the shuttle mechanism employed for advancing the film in said cameras.

One object of this invention is to furnish a shuttle mechanism wherein the time interval during which the film is stationarily positioned for exposure is comparatively long as compared to the time interval during which said film is being advanced by the shuttle mechanism, whereby the quantity of light employed for the illumination of sets when recording motion picture productions in studios may be reduced, or successful exterior exposures may be made under adverse light conditions.

Other objects and advantages will appear as the description of the invention progresses, and the novel feature of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and in which:—

Figure 1 is a plan view showing one embodiment of the invention taken on line 1—1 of Fig. 2, and Fig. 2 is another plan view of the same taken on line 2—2 of Fig. 1, and Fig. 3 is a plan view of a modified form of the invention taken on line 3—3 of Fig. 4, and Fig. 4 is a part plan, part sectional view of the same taken on line 4—4 of Fig. 3, and Fig. 5 is a plan view of another modified form of the invention taken on line 5—5 of Fig. 6, and Fig. 6 is a part plan, part sectional view of the same taken on line 6—6 of Fig. 5, and Figures 7 and 8 are diagrammatic views illustrating the operation of the invention with particular reference to Figures 5 and 6, and Fig. 9 is a plan view of a preferred form of shutter to be associated with the invention.

Referring to Figures 1 and 2, showing in part a shuttle mechanism unit 1, employed in a motion picture camera of the type more generally known as the Mitchell professional motion picture camera, and to which applicant's improvement has been adapted, to base, or bracket member 2, is secured bearing housing 3, rotatably supporting driven shaft 4 having gear 5 and cams 6 and 7 formed on the exposed end thereof. Also secured to said base member, is bearing housing 8 rotatably supporting driven shaft 9, having gear 10 and cam 11 formed on the exposed end thereof. Base member 2 also supports a film guide bracket member 12 positioned to form film groove 13 through which film 14 is advanced downwardly by claws, pawls or pins 15—15 secured to crank 16 reciprocably mounted on crosshead member 17 rotatably supported by stud 18 formed on cam 11 secured to gear 10. Reciprocably supported by crosshead 17 is U shaped slide member 19, the springs 20—20 normally restraining said slide member to the right in broached hole 21 of crank 16, whereby the extensions 22—22 of said slide impinge on surface 23 of said hole.

Crank 16 also is formed with tubular extension 24 reciprocably supported by bearing block 25 pivotally supported by post 26 secured to base 2. Said extension is formed with a flange 27 arranged to impinge on extension 28 of dogs or levers 29—29 pivotally supported by pin 30 to bearing boss 31 formed in bearing bracket 32 secured to film guide bracket 12.

Arranged to reciprocate in bearing boss 33 of bracket 32 is pilot pin bar 34 supporting cam slide member 35 having cam face 36 arranged to receive impingement of cam 7 to move said bar to the right, and rearwardly thereof cam face 37, arranged to receive impingement of cam 6, to move said bar to the left.

Bar 34 is also formed with a flanged portion 38 arranged to abut extensions 39—39 of dogs 29—29 whereby crank 16 may be restrained to the right independently of crosshead member 17.

Bar 34 is also formed with plate member 40 supporting pilot pins 41—41 operating in bosses 42—42 formed in film guide member 12.

Crank 16 is normally allocated on cam 11 by plate member 43 secured to stud 18 by nut 44.

Referring to Figures 3 and 4 showing a modified form of the invention wherein the driven shaft is caused to oscillate with respect to the driving shaft, the shuttle mechanism 50 is similar to unit 1, however, base member 51 is modified to include an elongated orifice 52 in which is arranged to oscillate bearing member 53 comprising sleeve portion 54 surrounded by flange portion 55, said sleeve portion having a shoulder 56 arranged to receive plate member 57 clamped thereagainst by nut 58, flange 55 and plate 57 acting to restrain alignment of shaft 9 with shaft 4. Bearing stud 60 secured to base member 51, pivotally supports rocker member 61 the lower orificed end 62 of which surrounds and acts to oscillate bearing unit 53 in elongated orifice 52, and the upper forked end 63 of which is arranged to receive eccentric cam 64 formed on shaft 4 to the rear of gear 5, said cam acting to effect movement of rocker member 61 whereby bearing member 53 is oscillated.

Shaft 9 and gear 10 are restrained against axial movement by nut 65 secured to said shaft.

Referring to Figures 5 and 6 showing another modification wherein the cam 11 is caused to rotate at lesser speed than the crank, or driven shaft 9, to gear 10 is secured crank disk member 70, having sleeve portion 71 arranged to allocate said disk with said gear, pin 72 acting to restrain simultaneous rotation of both of said members. Formed in disk member 70, is counter boss 73 acting as the bearing for internal gear member 74 having teeth 75 arranged to mesh with pinion 76 formed on the end of stationary shaft 77 rotatably supported within shaft 9 and extending therethrough to the rear exterior thereof, said stationary shaft having sector 78 rigidly secured to the protruding end thereof, said sector having a slot 79 arranged to receive stud 80 secured to base member 2, nut 81 acting to adjustably clamp said sector to said stud.

In this modification cam 11 and stud 18 are formed as part of internal gear unit 74, and said unit is allocated by plate member 82 suitably secured to disk member 70.

Referring to Fig. 9 showing the preferred form of shutter 85, employed in the camera to which applicant's improved shuttle mechanism is adapted, shutter blade 86 is formed with orifices 87, 88, 89 and 90, said orifices photographically comprising a single orifice, the re-enforcing ribs 91—91 acting to relatively allocate rim portion 92 and center portion 93. Shutter blade 86 is also formed with opaque sector portion 94, the leading edge 95 of which is obscured by an opaque semaphore blade 96 pivoted on pin 97, said semaphore blade having extension 98 arranged in the path of stationary cam 99, said extension being normally restrained against said cam by spring 100. The trailing edge 101 of said opaque sector portion is also obscured by another opaque semaphore blade 102 pivoted on pin 97, also having an extension 103, restrained against cam 99 by spring 104, said cam having a sufficiently wide face to receive both of said extensions. Shutter blade 86 is supported on a hub 105 suitably driven by shaft 106 the outer end of which may be supported by stationary cam 99 acting as a bearing therefor. Said cam is suitably rigidly secured to the camera body whereby rotation thereof is restrained.

Shutter 85 is assumed to be revolving clockwise as shown by arrow $x$, and the leading edge 107 of semaphore blade 96 has reached midway of photographic aperture 108 of the camera (not shown) to which said shutter is assumed to be attached. As said shutter continues to travel clockwise the cam hump 109 will act to also rotate semaphore 96 clockwise thereby maintaining the leading edge 107 substantially parallel to the upper and lower margins of said aperture, in this manner producing a focal plane shutter effect by the use of a rotating plane shutter as 85.

As the trailing semaphore 102 begins to uncover aperture 108, its trailing edge 110 will be substantially parallel to the upper margin of said aperture and by action of cam hump 109 on extension 103, said trailing edge will remain substantially parallel thereto during the entire uncovering of said aperture by said trailing edge. Cam 109 is preferably so formed that operation of the shutter in either direction will produce the focal plane shutter effect described.

Referring to Figures 1 and 2, the gears 5 and 10 are proportioned whereby gear 10 rotates two times for each rotation of gear 5. This ratio may be varied in uniform multiples, for example, gear 10 may be caused to rotate three or four, or higher even multiples thereof. As shown in Figures 1 and 2, cam 6 has moved pilot pin bar 34 to the left whereby pilot pins 41—41 have entered the perforation 14a in film 14 for the anchoring thereof in slot 13, and whereas crank 16 has been rotated by gear 10 to a point whereby the pawls 15—15 thereof would ordinarily engage said perforations in said film for the advancement thereof, said crank is restrained from advancing said film by dogs or levers 29—29, the extensions 28—28 of which impinge on flange 27 of extension 24 of said crank thereby limiting its movement to the left. Cam 11, however, is restraining said crank to the left and by this action restrains slide member 19 to the left thereby compressing springs 20—20 as shown. In other words, cam 11 in place of moving crank to the left sufficiently to engage film 14, acts to move slide member 19 to the left during the period said dogs are restraining said crank from engaging said film perforations.

After gear 10 has completed substantially another revolution, cams 6 and 7 will have rotated substantially to the position shown by Fig. 8, cam 6 acting to move pilot pin bar 34 to the right whereby pilot pins 41—41 are removed from film perforations 14a, and, as crank 16 is now advanced to the left by cam 11, its pawls 15—15 will enter said film perforations and said film will be advanced as said crank moves downwardly by continued rotation of gear 10, the dogs 29—29 being ineffective to restrain said crank movement, as the flange portion 38 formed on said pilot bar has also been moved to the right whereby said dogs will not be caused to forcibly restrain flange 27 of crank 16 to the right.

Stated briefly, during one revolution of gear 10 the film 14 is advanced by crank 16 and during the succeeding revolution said film is not so advanced thereby producing comparatively long stationary periods of said film as compared to the periods during which said film is being advanced by crank 16. It is obvious from the foregoing description that the time interval during which a film, as 14, is advanced has been reduced substantially one-half, such operation permitting the use of shutter having as much as 300 degrees shutter opening, or exposure.

Referring to Figures 4 and 5, whereas in the structure shown in Figures 1 and 2, the normal movement of crank 16 was restrained by dogs 28—28, in the structure shown in Figures 3 and 4 the cam 64 acts to oscillate the entire unit 53 whereby during one rotation of gear 10 said unit is moved to the left and crank 16 will advance film 14, and during the succeeding revolution said unit is moved to the right and said crank will be ineffective to advance said film.

Referring to the modification shown in Figures 5 and 6, the ratio of internal gear 74 and pinion 76 is two to one, said internal gear unit revolving one-half revolution each time gear 10 revolves a complete revolution, in other words, cam 11 formed on internal gear unit 73 will revolve one-half revolution during each complete revolution of gear 10. Referring to Fig. 7 it will be noted the hump on cam 11 is facing to the right thereby acting to prevent crank 16 from advancing film 14 in slot 13, whereas by reference to Fig. 8, it will be noted said hump is facing to the left thereby acting to move said crank sufficiently to the left whereby said film is engaged and advanced as gear 10 is rotated. In Fig. 8 gear 10 is assumed to have been rotated a complete revolution from the position shown in Fig. 7, whereas cam 11 has only rotated one-half revolution.

From the foregoing it will be obvious that during one revolution of gear 10 crank 16 will be positioned to advance film as said gear is rotated and during the succeeding revolution said crank will be ineffective to advance said film. Also that during the revolution of said gear that said film is not being advanced, pilot bar 34 will be positioned to lock said film in slot 13 whereby photographic records may be accurately impressed thereon through aperture 108.

Whereas in my co-pending application Serial No. 306,915, filed Sept. 19, 1928, the driven gear, as 10, is arranged to rotate at variable speeds whereby a crank, as 16, is caused to engage and advance said film during the period of high rotative speed thereof, and to not so engage said film during the periods of low rotative speed thereof, in this improvement the driven gear, as 10, is caused to rotate at a uniform speed and said crank is caused to engage said film for advancement thereof only during alternate rotations of said gear, however said gear is caused to rotate at comparatively high rotative speed whereby said film is more rapidly advanced when and as said crank engages said film for the advancement thereof.

What I claim is:—

1. A film advancing mechanism for motion picture apparatus which comprises, two meshed gear members, one rotating at twice the speed of the other, a film advancing member pivotally supported independently of the gears arranged to engage and advance the film relatively to a photographic aperture, means operated by the high rotative speed gear member arranged to effect engagement and advancement of the film by the advancing member during each revolution thereof, and means operatively associated with the low rotative speed gear member arranged to annul the engagement of the film by the advancing member each alternate revolution of the high rotative speed gear member.

2. A film advancing mechanism for motion picture apparatus which comprises, two meshed gear members, one rotating at twice the speed of the other, a film advancing member pivotally supported independently of the gear members arranged to engage and advance the film relatively to a photographic aperture, means operated by the high rotative speed gear member arranged to effect engagement and advancement of the film by the advancing member during each revolution thereof, means associated with the low rotative speed gear member arranged to annul the engagement of the film by the advancing member each alternate revolution of the high rotative speed gear member, and a locking member operatively associated with the low rotative speed gear member arranged to lock the film against movement during the period the film advancing member is dis-engaged therefrom.

3. Film advancing mechanism for motion picture apparatus which comprises, two meshed gear members, one rotating at twice the speed of the other, a film advancing member pivotally mounted independently of the gear members arranged to reciprocatingly engage and oscillatingly advance the film relatively to a photographic aperture, means operated by the high speed gear member for effecting oscillating movement of the advancing member during each revolution thereof whereby the film may be advanced during the oscillating movement of the member, and means operatively associated with the low speed gear member for effecting reciprocation of the advancing member whereby during one oscillation thereof the film will be engaged and advanced by the member and the following oscillation thereof the member will not so engage and advance the film.

4. Film advancing mechanism for motion picture apparatus which comprises, two meshed gear members, one rotating at twice the speed of the other, a film advancing member pivotally mounted independently of the gear members arranged to reciprocatingly engage and oscillatingly advance the film relatively to a photographic aperture, means operated by the high speed gear member for effecting oscillating movement of the advancing member during each revolution thereof whereby the film may be advanced during the oscillating movement of the member, and means operatively associated with the low speed gear member for effecting reciprocation of the advancing member in half time relation to the oscillation thereof whereby the film will be engaged and advanced only each alternate oscillation of the advancing member.

5. Film advancing mechanism for motion picture apparatus which comprises, two meshed gear members, one rotating at twice the speed of the other, a film advancing member pivotally mounted independently of the gear members arranged to reciprocatingly engage and oscillatingly advance the film relatively to a photographic aperture, means operated by the high speed gear member for effecting oscillating movement of the advancing member during each revolution thereof whereby the film may be advanced during the oscillating movement of the member, means operatively associated with the low speed gear member for effecting reciprocation of the advancing member in half time relation to the oscillation thereof whereby the film will be engaged and advanced only each alternate oscillation of the advancing member, and a locking member operatively associated with the low speed gear member arranged to engage and lock the film against movement during the period the advancing member is dis-engaged therefrom.

6. A film advancing mechanism for motion picture apparatus which comprises, two meshed gear members, one gear member rotating at an even multiple of the other gear member, a film advancing member pivotally mounted independently of the gear members arranged to engage and advance the film relatively to a photographic aperture, means operated by the high speed gear member arranged to effect engagement and advancement of the film by the advancing member during each revolution thereof, and means operatively associated with the low speed gear member arranged to effect the engagement of the film by the advancing member only during the revolution of the high speed gear member corresponding to the even multiple ratio of one of the gear members to the other gear member.

7. A film advancing mechanism for motion picture apparatus which comprises, two meshed gear members, one gear member rotating at an even multiple of the other gear member, a film advancing member pivotally mounted independently of the gear members arranged to engage and advance the film relatively to a photographic aperture, means operated by the high speed gear member arranged to effect engagement and advancement of the film by the advancing member during each revolution thereof, means operatively associated with the low speed gear member arranged to effect the engagement of the film by the advancing member only during the revolution of the high speed gear member corresponding to the even multiple ratio between the gear members, and a locking member operably associated with the low speed gear member arranged to lock the film against movement during the period the film advancing member is dis-engaged therefrom.

8. A film advancing mechanism for motion picture apparatus which comprises, two meshed gear members, a pivotally supported oscillating member supporting one of the gear members for effecting bodily movement thereof without affecting the meshing of the gear members, a film advancing member operatively mounted to engage and advance the film relatively to a photographic aperture, actuating means supported by the bodily moved gear member for operating the film advancing member to engage and advance the film, and means associated with the non-bodily moved gear member arranged to effect oscillation of the pivotally supported member whereby the film advancing member will be operated to engage and advance the film during one revolution of the bodily moved gear member and will be operated without engaging and advancing the film during other revolutions thereof.

9. A film advancing mechanism for motion picture apparatus which comprises, two meshed gear members, a pivotally supported oscillating member supporting one of the gear members for effecting bodily movement thereof without affecting the meshing of the gear members, a film advancing member operatively mounted to engage and advance the film relatively to a photographic aperture, actuating means supported by the bodily moved gear member for operating the film advancing member to engage and advance the film, means operatively associated with the non-bodily moved gear member arranged to effect oscillation of the pivotally supported member whereby the film advancing member will be operated to engage and advance the film during one revolution of the bodily moved gear member and will be operated without engaging and advancing the film during other revolutions thereof, a locking member operatively mounted to engage and lock the film against movement, and means operatively associated with the non-bodily moved gear member arranged to operate the locking member to engage and lock the film against movement during the periods the advancing member is not advancing the film.

10. A film advancing mechanism for motion picture apparatus which comprises, two meshed gear members, one rotatable at twice the speed of the other, a pivotally supported oscillating member supporting the high speed gear member arranged to effect bodily movement thereof without affecting the meshing of the gear members, a film advancing member operatively mounted to engage and advance the film relatively to a photographic aperture, means supported by the high speed gear member arranged to operate the advancing member whereby the film will be engaged and advanced during each revolution thereof, and means operatively associated with the low speed gear member for effecting oscillation of the pivotally supported member whereby the advancing member will engage and advance the film only during each alternate revolution of the high speed gear member.

11. A film advancing mechanism for motion picture apparatus which comprises, two meshed gear members, one rotatable at twice the speed of the other, a pivotally supported oscillating member supporting the high speed gear member arranged to effect bodily movement thereof without affecting the meshing of the gear members, a film advancing member operatively mounted to engage and advance the film relatively to a photographic aperture, means supported by the high speed gear member arranged to operate the advancing member whereby the film will be engaged and advanced during each revolution thereof, means operatively associated with the low speed gear members for effecting oscillation of the pivotally supported member whereby the advancing member will engage and advance the film only during each alternate revolution of the high speed gear member, and a locking member operatively associated with the low speed gear member arranged to engage and lock the film against movement during the period the advancing member is not advancing the film.

12. A film advancing mechanism for motion picture apparatus which comprises, two meshed gear members, one rotating at an even multiple of the other member, two independently mounted pin supporting arms, one operable to engage and lock the film against movement and the other operable to engage and advance the film relatively to a photographic aperture, means operable by the high speed gear member arranged to operate the film advancing arm for engagement and advancement of the film during each revolution thereof, means operatively associated with the low speed gear member arranged to operate the locking arm for locking the film against movement during the period the advancing arm is disengaged therefrom, and means operated by the locking arm arranged to restrain the advancing arm from engaging the film for the advancement thereof whereby the film is engaged and advanced during one revolution of the high speed gear member and is not so engaged and advanced during other revolutions thereof, the engaging and advancing periods of the advancing member being synchronous with the revolutions of the low speed gear member.

13. A film advancing mechanism for motion picture apparatus which comprises, two meshed gear members, one rotating at twice the speed of the other, two independently mounted pin supporting arms, one operable to engage and lock the film against movement and the other operable to engage and advance the film relatively to a photographic aperture, means operable by the high speed gear member arranged to operate the film advancing arm for engagement and advancement of the film during each revolution thereof, means operatively associated with the low speed gear member arranged to operate the locking arm for locking the film against movement during the period the advancing arm is dis-engaged therefrom, and means operated by the locking arm arranged to restrain the advancing arm from engaging the film for advancement thereof whereby the engagement and advancement thereof will be effected only during each alternate revolution of the high speed gear member.

14. A film advancing mechanism for motion picture apparatus which comprises, two meshed gear members, a film advancing member operatively mounted to engage and advance the film relatively to a photographic aperture, a rotatable actuating member positioned eccentrically on one of the gear members for operating the advancing member to engage and advance the film, means operatively associated with the last named gear member for rotating the actuating member in an even multiple of rotation with respect to the rotation of the gear by which the actuating member is supported whereby the film advancing member will engage and advance the film only during predetermined revolutions of the gear member, and a locking member operable by the other gear member arranged to lock the film against movement during the period the advancing member is dis-engaged from the film.

15. A film advancing mechanism for motion picture apparatus which comprises, a rotatable driven member, a film advancing member operably mounted arranged to engage and advance the film relatively to a photographic aperture, a rotatable actuating member positioned eccentrically on the driven member arranged to operate the advancing member whereby an oscillating movement thereof is effected by the rotation of the driven member and a reciprocating movement thereof is effected by the rotation of the actuating member, and means for rotating the actuating member at a speed with respect to the driven member whereby the oscillations of the advancing member will be an even multiple of the reciprocations thereof whereby the film will be engaged and advanced only during predetermined alternate revolutions of the driven member.

16. A film advancing mechanism for motion picture apparatus which comprises, a rotatable driven member, a film advancing member operatively mounted arranged to engage and advance the film relatively to a photographic aperture, a rotatable actuating member positioned eccentrically on the driven member arranged to operate the advancing member whereby an oscillating movement thereof is effected by the rotation of the driven member for advancing the film and a reciprocating movement thereof is effected by the rotation of the actuating member for engaging the film for advancement, and means for rotating the actuating member at an even multiple with respect to the rotative speed of the driven member whereby the advancing member will be reciprocated to engage the film for advancement only during predetermined alternate oscillations thereof effected by the driven member.

17. A film advancing mechanism for motion picture apparatus which comprises, a rotatable driven member, a film advancing member operatively mounted arranged to engage and advance a film relatively to a photographic aperture, a rotatable actuating member positioned eccentrically on the driven member arranged to operate the advancing member whereby an oscillating movement thereof is effected by the rotation of the driven member for advancing the film and a reciprocating movement thereof is effected by the rotation of the actuating member for engaging the film for the advancement thereof, means for rotating the actuating member at an even multiple ratio with respect to the rotative speed of the driven member whereby the advancing member will be reciprocated to engage the film for advancement only during predetermined alternate oscillations thereof effected by the driven member, and a locking member operating synchronously with the driven member arranged to engage and lock the film against movement during the periods the advancing member is dis-engaged from the film.

18. A film advancing mechanism for motion picture apparatus which comprises, a rotatable driven member, a film advancing member operatively mounted arranged to engage and advance the film relatively to a photographic aperture, a rotatable actuating member positioned eccentrically on the driven member arranged to operate the advancing member whereby an oscillating movement thereof is effected by the rotation of the driven member for advancing the film and a reciprocating movement thereof is effected by the rotation of the actuating member for engaging the film for the advancement thereof, and means including gearing forming a part of the actuating member for effecting the rotation thereof at an even multiple ratio with respect to the rotative speed of the driven member whereby the advancing member will be reciprocated to engage the film for advancement only during predetermined oscillations thereof.

19. A film advancing mechanism for motion picture cameras which comprises, a rotatable driven member having a two faced cam member supported thereby, a film advancing lever having one end portion thereof pivotally supported and the other end portion thereof arranged to engage and advance the film relatively to a photographic aperture, means operated by the driven member engaging the advancing lever between the pivotal portion and the engaging and advancing portion thereof arranged to effect oscillation of the lever with respect to the pivotal point thereof whereby the engaging and advancing portion thereof may engage and advance the film in one direction of travel and not so engage the film in the other direction of travel thereof, and means actuated by the cam faces of the cam member for operating the advancing lever independently of the oscillation thereof arranged to effect engagement of the film by the lever by the movement of one of the cam faces relatively thereto during the oscillating movement of the lever in the direction to advance the film and effect dis-engagement of the lever from the film by the movement of the other cam face relatively to the cam operated means during the oscillation of the lever in the non-advancing oscillating direction thereof.

20. Film advancing mechanism for motion picture apparatus comprising, a film locking arm having a film locking portion formed at the inner end thereof arranged to engage and lock the film against movement while an image is being recorded thereonto through an aperture, a lever engaging portion formed on the outer end portion of the arm, means for reciprocably supporting the arm whereby movement thereof in one direction will effect engagement of the inner end portion thereof with the film and movement in the other direction will effect disengagement therefrom to permit the advancement thereof, a film advancing arm having a film advancing portion formed at the inner end thereof arranged to engage and advance the film relatively to the aperture alternately with being disengaged therefrom, a lever engaging portion formed at the outer end portion of the advancing arm, the lever engaging portion of the advancing arm being positioned spacedly from the lever engaging portion of the locking arm, means for slidably oscillatively supporting the outer end portion of the advancing arm, means operatively associated with the advancing arm for effecting intermittent advancement of the film thereby, pivotally supported oscillating lever members positioned in the space between the lever engaging portions of the arms, one extension of the lever members engaging the lever engaging portion of the locking arm and the other extension of the lever members engaging the lever engaging portion of the advancing arm, the movement of one of the arms being arranged to control the movement of the other arm through the lever members.

In testimony whereof I have affixed my signature.

OSCAR A. ROSS.